(12) United States Patent
Fajardo et al.

(10) Patent No.: US 8,139,603 B2
(45) Date of Patent: Mar. 20, 2012

(54) ARCHITECTURE FOR MULTIPLE MIH USERS

(75) Inventors: Victor Fajardo, Robbinsville, NJ (US);
Yoshihiro Oba, Englewood Cliffs, NJ (US); Yuu-Heng Alice Cheng, Piscataway, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 785 days.

(21) Appl. No.: 12/168,140

(22) Filed: Jul. 6, 2008

(65) Prior Publication Data

US 2009/0016286 A1    Jan. 15, 2009

Related U.S. Application Data

(60) Provisional application No. 60/948,351, filed on Jul. 6, 2007, provisional application No. 60/949,579, filed on Jul. 13, 2007.

(51) Int. Cl.
*H04J 3/00* (2006.01)
(52) U.S. Cl. .......................................................... 370/464
(58) Field of Classification Search ........................ None
See application file for complete search history.

(56) References Cited

U.S. PATENT DOCUMENTS

| | | | | |
|---|---|---|---|---|
| 2006/0187882 | A1* | 8/2006 | Kwak et al. | 370/331 |
| 2006/0240832 | A1* | 10/2006 | Kim et al. | 455/438 |
| 2007/0025294 | A1* | 2/2007 | Kim et al. | 370/331 |
| 2007/0047491 | A1* | 3/2007 | Dutta et al. | 370/331 |
| 2007/0072605 | A1* | 3/2007 | Poczo | 455/432.2 |
| 2007/0091846 | A1* | 4/2007 | Kim et al. | 370/331 |

OTHER PUBLICATIONS

PCT International Search Report, Mar. 27, 2009, pp. 1-5.
Rajkumar A: "MIH User" IEEE 802.21 Media Independent Handover, May 17, 2007, pp. 1-5, XP007906824, p. 4.
"IEEE P802.21/D07.00—Draft Standard for Local and Metropolitan Area Networks: Media Independent Handover Services" Draft IEEE Standard for Local and Metropolitan Area Networks, IEEE, US, vol. P802.21/D07.00, Jul. 1, 2007, p. 339pp, XP007906807, section 5.3.
Korean Office Action dated Jun. 27, 2011, issued in corresponding Korean Patent Application No. 10-2011-7011117.

* cited by examiner

*Primary Examiner* — Chi Pham
*Assistant Examiner* — Fan Ng
(74) *Attorney, Agent, or Firm* — Westerman, Hattori, Daniels & Adrian, LLP

(57) ABSTRACT

Currently, the I.E.E.E. 802.21 specification allows multiple MIH (Media-Independent Handover) Users in a single MIH Function. However, the specification is not clear about how multiple MIH Users are supported by a single MIHF (MIH Function) under a constraint in which if there is only one MIH User is allowed to change the state of a particular link during a particular period of time. This document proposes a detailed architecture which allows for the co-existence of multiple MIH Users by introducing a link ownership scheme in the MIHF (MIH Function). The proposed link ownership scheme also supports the scenario in which the state of a link of a mobile node is changed by a network node by modifying the MIH_Register primitives in the I.E.E.E. 802.21 specification to signal the set of allocated links to a remote MIH User on the network node. The modification of MIH_Register primitive also has the added benefit of allowing the network node to subscribe to events on a specific set of links present in the mobile node as opposed to not knowing any of the links at all.

22 Claims, 7 Drawing Sheets

Multiple MIH User allocation via Link Ownership

*Figure 1.* Multiple MIH User allocation via Link Ownership

*Figure 2.* Remote Link Ownership allocation

*Figure 3.* Remote Link Ownership De-allocation via De-Register primitives

FIG. 4 — MIHF Communication Model

FIG. 5

LOGICAL NETWORK REFERENCE MODEL

ARCHITECTURE FOR MULTIPLE MIH USERS

The present application claims priority under 35 U.S.C. 119 to U.S. Provisional Application Ser. No. 60/948,351 entitled An Architecture for Multiple MIH Users for an 802.21 Entity filed on Jul. 6, 2007 and to U.S. Provisional Application Ser. No. 60/949,579 entitled An Architecture for Multiple MIH Users for an 802.21 Entity filed on Jul. 13, 2007, the entire disclosures of which are incorporated herein by reference.

BACKGROUND

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An I.E.E.E. standard, I.E.E.E. 802.11, specifies technologies for wireless LANs and devices.

Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (I.E.E.E. 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an I.E.E.E. MAC address. Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (I.E.T.F.). With Mobile IP, mobile device users can move across networks while maintaining their IP Address assigned once. See Request for Comments (RFC) 3344. NB: RFCs are formal documents of the Internet Engineering Task Force (IETF).

Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Handovers Between Heterogeneous Networks (e.g., I.E.E.E. 802.21):

The purpose of the I.E.E.E. 802.21 standard is to enhance the user experience of mobile devices by supporting handovers between heterogeneous networks. This standard describes a standard to satisfy the requirements for media independent handover. The standard addresses the support of handovers for both mobile and stationary users. For mobile users, handovers may occur due to changes in wireless link conditions. Additionally, handovers may occur due to changes in radio conditions of serving or target links that result from mobile node movement. For the stationary user, handovers may become imminent when the surrounding environment changes, making one network more attractive than another. Another possibility is that the user may choose an application which requires a handover to a higher data rate channel, for example during download of a large data file. In all cases, service continuity should be maximized during the handover. As an example when making a network transition during a phone call the handover procedure should be executed during a pause in the conversation so as to minimize any perceptible interruption in service.

The I.E.E.E. 802.21 standard supports cooperative use of information available at the mobile terminal and within the network infrastructure. The mobile node is well-placed to detect available networks. The network infrastructure is well-suited to store overall network information, such as neighborhood cell lists, location of mobile devices, and higher layer services available. Both the mobile node and the network may make decisions about connectivity. In general, both the mobile node and the network points of attachment such as base stations and access points may be multi-modal (i.e., capable of supporting multiple radio standards and simultaneously supporting connections on more than one radio interface).

The overall network may include pico cells such as I.E.E.E. 802.15, micro cells such as IEEE 802.11, and macro cells (such as 3GPP, 3GPP2, or I.E.E.E. 802.16 coverage) which in general will intersect. The handover process may be conditioned by measurements and triggers supplied by the link layers on the mobile node. The measurements report metrics that are typically used in handover algorithms, such as signal quality, synchronization time differences, and transmission error rates. Specifically, the standard includes the following elements:

a) A framework that enables seamless service continuity while a mobile node (MN) switches between heterogeneous link-layer technologies. The framework relies on the identification of a mobility management protocol stack within the network elements that support the handover. The description of the framework does not address implementation details and does not provide indication of preferred implementations of the I.E.E.E. 802.21 standard. The framework presents the media independent handover (MIH) Reference models for different link layer technologies.

b) A set of handover-enabling functions within the protocol stacks of the network elements and a new entity created therein called the MIH Function (MIHF).

c) A media independent Service Access Point (called the MIH_SAP) and associated primitives are defined to provide MIH Users with access to the services of the MIHF. (NB: MIH Users are entities that use the services provided by the MIHF. MIH Users use the MIH_SAP to interact with the MIHF). The MIHF provides the following services:

1) The Media Independent Event service detects events and delivers triggers from both local, as well as remote interfaces.

2) The Media independent Command service provides a set of commands for the MIH Users to control handover relevant link states.

3) The Media Independent Information Service provides the information model for query and response, thus enabling more effective handover decision making across heterogeneous networks.

d) The definition of new link layer SAPs and associated primitives for each media specific technology. The new primitives help the MIHF collect link information and control link behavior during handovers.

If applicable, the new SAPs may be recommended as amendments to the respective media specific technology standard.

Media Independent Handover Services:

In, e.g., I.E.E.E. P802.21/D.01.09, September 2006, entitled Draft IEEE Standard for Local and Metropolitan Area Networks: Media Independent Handover Services (the entire disclosure of which is incorporated herein by reference), among other things, the document specifies 802 media access-independent mechanisms that optimize handovers between 802 systems and cellular systems. The I.E.E.E. 802.21 standard defines extensible media access independent mechanisms that enable the optimization of handovers between heterogeneous 802 systems and may facilitate handovers between 802 systems and cellular systems.

The scope of the IEEE 802.21 (Media Independent Handover) standard is to develop a specification that provides link layer intelligence and other related network information to upper layers to optimize handovers between heterogeneous media. This includes links specified by 3GPP, 3GPP2 and both wired and wireless media in the I.E.E.E. 802 family of standards. Note, in this document, unless otherwise noted, "media" refers to method/mode of accessing a telecommunication system (e.g. cable, radio, satellite, etc.), as opposed to sensory aspects of communication (e.g. audio, video, etc.). See, e.g., Section 1.1 of I.E.E.E. P802.21/D.01.09, September 2006, entitled Draft I.E.E.E. Standard for Local and Metropolitan Area Networks:

The I.E.E.E. 802.21 standard is intended to facilitate a variety of handover methods. Such methods are generally classified as 'hard' or 'soft', depending on whether the handover procedure is "break before make" or "make before break" with respect to the data transport facilities that support the exchange of data packets between the mobile node and the network.

In general, handover involves cooperative use of both mobile node and network infrastructure in order to satisfy network operator and end user needs. Handover control, handover policies and other algorithms involved in handover decision making are generally handled by communication system elements which do not fall within the scope of the I.E.E.E. 802.21 standard. However, it is beneficial to describe certain aspects of the overall handover procedure so that the role and purpose of MIH Event Service, MIH Command Service, MIH Information Service and MIHF in overall handover process is clear.

General Design Principles:

The I.E.E.E. 802.21 standard is based on the following general design principles.

a) MIH Function is logical entity that helps and facilitates handover decision-making. Upper layers make handover decisions and link selection based on inputs and context from MIHF. Facilitating the recognition that a handover should take place is one of the key goals of MIHF. Discovery of information on how to make effective handover decisions is also a key component.

b) MIHF provides abstracted services to higher layers. (NB: Higher Layers involve the layers that make use of the services provided by the MIHF and hence may be referred to as MIH Users. Examples of higher layers are internet protocol (IP), Mobile IP, SIP, transmission control protocol (TCP), user datagram protocol (UDP), and Application layer.) From that perspective MIHF offers a unified interface to the upper layers. The service primitives exposed by this unified interface are based on the technology specific protocol entities of the different access networks. The MIHF communicates with the lower layers of the mobility-management protocol stack through technology-specific interfaces.

The specification of the MIHF interfaces with the lower layers generally does not fall within the scope of this standard. Such interfaces may already be specified as service access points (SAPs) within the standards that pertain to the respective access technologies, such as I.E.E.E. 802.1, I.E.E.E. 802.3, I.E.E.E. 802.11, I.E.E.E. 802.16, 3GPP and 3GPP2. This standard may contain recommendations to amend the existing access technology specific standards when modifications of the lower-layer interfaces may enable or enhance MIHF functionality.

c) Handover signaling (as part of handover execution and subsequent updates) may not be part of the standard. Different access networks support horizontal handover mechanisms (mobile initiated, network initiated, etc.). Handover initiation trigger may be useful in heterogeneous handovers when not done as per the homogeneous scheme.

d) MIHF may do further processing on MAC/PHY triggers and other related local events. Definition of this processing is outside the scope of the standard. The standard shall provide support for remote events as well. Events are advisory in nature. The decision whether to cause a handover or not based on these events is outside the scope of the standard.

e) The standard shall specify mechanisms to support MN-initiated, MN-controlled, network-initiated and network-controlled handovers.

f) The standard may support transparent inter-working with legacy equipment. Thus, I.E.E.E. 802.21 compatible equipment should be able to co-exist with legacy non I.E.E.E. 802.21 compliant equipment.

Media Independent Handover Reference Framework:

The following sections describe points with regards to communication between different MIHF entities in the client device (MN) and the network.

MIHF functions communicate with each other for various purposes. The client device (mobile node) exchanges MIH information with its MIH Point of Service. The MIHF in any Network Entity becomes an MIH PoS when it communicates directly with a MN based MIHF. An MIH Network Entity may not have a direct connection to the MN and therefore does not constitute an MIH PoS for that particular MN. The same MIH Network Entity may still act as MIH PoS for a different MN. MIHF communication may not take place on all L2 interfaces of an MIH capable MN. As an example, on an MIH capable MN with three L2 interfaces namely 802.11, 802.16, and 802.3, the 802.3 interface may be used only for system administration and maintenance operations, while the 802.11 and 802.16 interfaces may engage in the provision of MIHF services. The MN may use L2 transport for exchanging MIH information with an MIH PoS that resides in the same Network Entity as its Network PoA. The MN may use L3 transport for exchanging MIH information with an MIH PoS that may not reside in the same Network Entity as its Network PoA. The framework supports use of either L2 or L3 mechanisms toward communication among MIH network entities.

Figure 4:
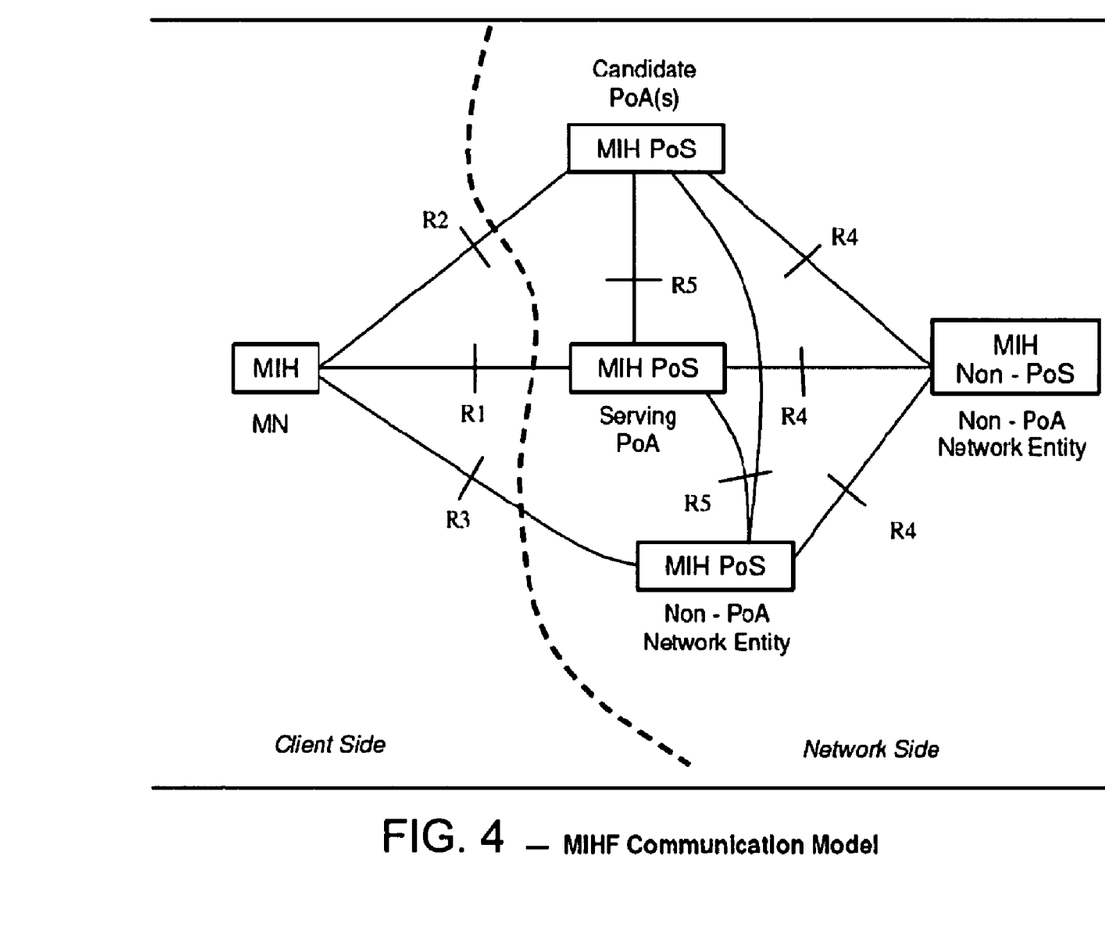
FIG. 4 is a diagram depicting an illustrative MIHF communication model under the 802.21 specification.

FIG. 4 shows an illustrative MIH communication model. The model shows MIHFs in different distinctive roles and the communication relationships amongst them. The communication relationship shown in FIG. 4 applies only to MIHFs. It is important to note that each of the communication relationships in the communication model does not imply a particular transport mechanism. Rather, a communication relationship only intends to show that MIHF related information passing is possible between the two distinctive MIHFs. Moreover, 1) MIHF on the MN, 2) MIH PoS on the Network Entity that includes the serving PoA of the MN, 3) MIH PoS on the Network Entity that includes a candidate PoA for the MN (a candidate PoA is a PoA that the MN is aware of but not currently attached to; it becomes the target PoA if a handover eventually occurs), 4) MIH PoS on a Network Entity that does not include a PoA for the MN, 5) MIH non-PoS on a Network Entity that does not include a PoA for the MN.

The communication model also identifies the following communication reference points between different instances of MIHFs.

1) Communication reference point R1: Reference Point R1 refers to MIHF procedures between the MIHF on the MN and the MIH PoS on the Network Entity of its serving PoA. R1 may encompass communication interfaces over both L2 and L3 and above. MIHF content passed over R1 may be related to MIIS, MIES, or MICS.

2) Communication reference point R2: Reference Point R2 refers to MIHF procedures between the MIHF on the MN and the MIH PoS on the Network Entity of a candidate PoA. R2 may encompass communication interfaces over both L2 and L3 and above. MIHF content passed over R2 may be related to MIIS, MIES, or MICS.

3) Communication reference point R3: Reference Point R3 refers to MIHF procedures between the MIHF on the MN and the MIH PoS on a non-PoA Network Entity. R3 may encompass communication interfaces over L3 and above and possibly L2 transport protocol like Ethernet bridging, MPLS, etc. MIHF content passed over R3 may be related to MIIS, MIES, or MICS.

4) Communication reference point R4: Reference Point R4 refers to MIHF procedures between an MIH PoS in a Network Entity and an MIH non-PoS instance in another Network Entity. R4 may encompass communication interfaces over L3 and above. MIHF content passed over R4 may be related to MIIS, MIES, or MICS.

5) Communication reference point R5: Reference Point R5 refers to MIHF procedures between two MIH PoS instances in distinct Network Entities. R5 may encompass communication interfaces over L3 and above. MIHF content passed over R5 may be related to MIIS, MIES, or MICS.

Figure 5:
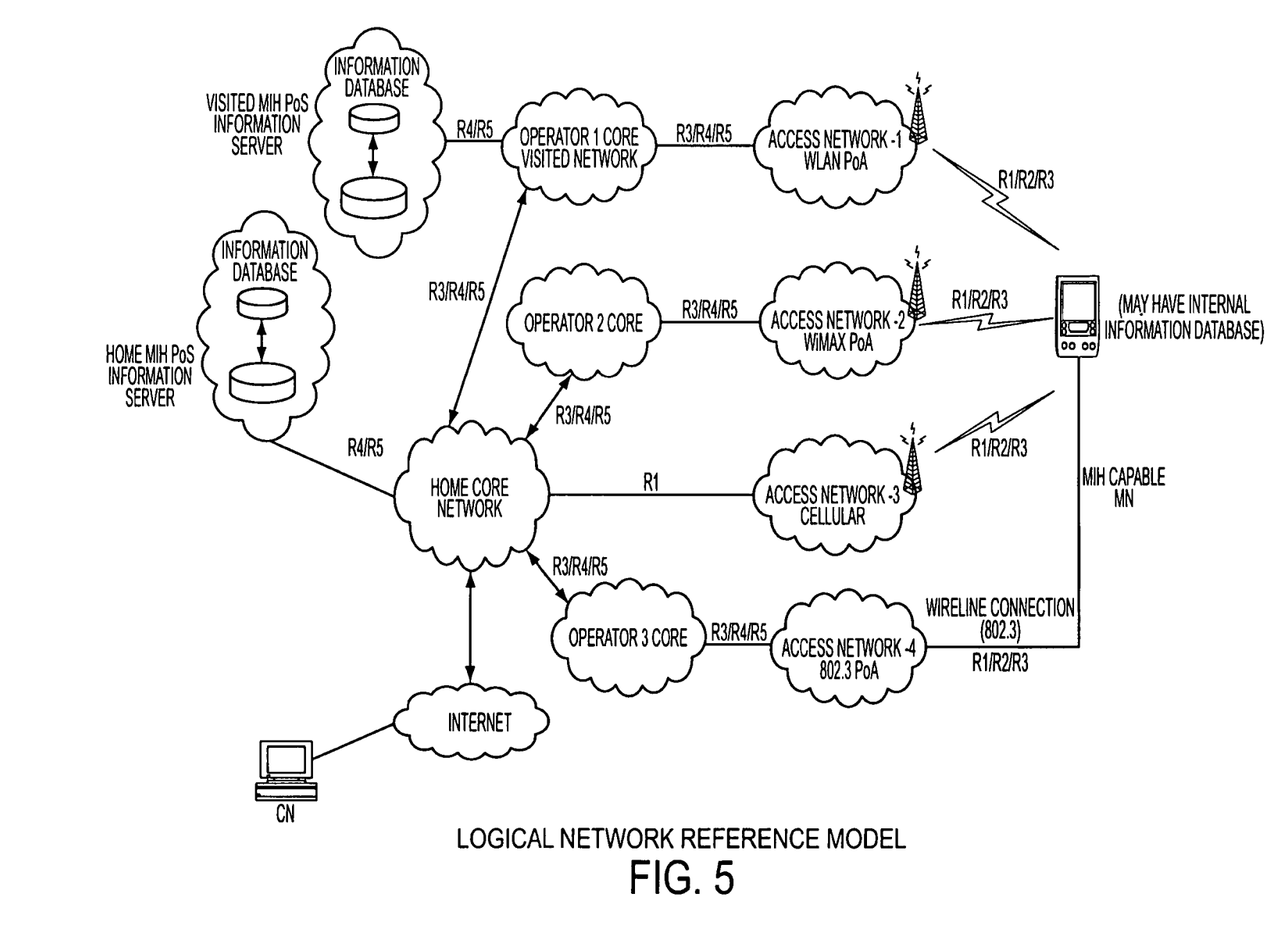
FIG. 5 is a diagram depicting an illustrative logical network reference model under the 802.21 specification.

Illustration of the MIH Communication Model:

A network model including MIH services is shown in FIG. 5 for greater illustration of the MIH Communication Reference Points. Moving from right to left, the model includes an MIH-capable mobile node (MN, far right) that supports multiple wired and wireless access technology options. The model assumes that the provisioning service provider either operates multiple access technologies or allows its user to roam into other networks when SLA in support of interworking has been established. The MN has an MIHF implemented, which enables it to send specific MIH queries. The MN may have the information service partially implemented internally.

The model illustrates access networks that are connected in some loose, serial way to a core network (Operator 1-3 Core). Also depicted is an access network that is more tightly interworked or coupled (Access Network-3). The Operator 1-3 Core each might represent a service provider, corporate intranet provider or just another part of the visited or home access, or even core network. In this model, the provisioning provider is operating Access Network-3 coupled via R1 to a core (labeled Visited/Home Core Network). The terms Visited and Home are used to indicate the provisioning service provider or enterprise. Any of the illustrated networks could be both a visited or home network depending on the relation of the operator to the provisioner of the MN.

Network providers offer MIH services in their access networks (Access Network-1 to 4) to facilitate handover into their networks. Each access technology either advertises its MIH capability or responds to MIH service discovery. Each service provider for the access network allows access to one or more MIH Points of Service (PoS, compare with Communication Model) These PoS may provide some or all of the MIH services as determined during MIH capabilities discovery. The location or node of an MIH PoS is not fixed by the standard. The PoS location may vary based on operator deployment scenario and the technology-specific MIH architecture.

An MIH PoS may reside next to or be co-located with the point of attachment (PoA) in the access network Access Network 1,2,4 are typical). Alternatively, the PoS may reside deeper inside the access or core networks (Access Network 3 is typical). The MIH entity in the MN communicates with MIH network entities either by R1, R2 or R3 over any access network. When the PoA in the serving access network has a co-located MIH function, then an R1 reference connection terminates at the PoA which is also the PoS (MN to Access Network 1,2,4 of the model could all be R1). In that case an R3 reference connection would be terminated at any non-PoA (also illustrated by MN to Access Networks 1,2,4). MIH events may originate at both sides of an active R1 link. The MN is typically the first node to react to these events.

The interaction of visited and home network could be either for control and management purposes or for data transport purposes. It is also possible that due to roaming or SLA agreements, the home network may allow the MN to access the public Internet directly through a visited network. As illustrated, two MIH network entities may communicate with each other via R4 or R5 reference connections. The MIH capable PoA may also communicate with other MIH network entities via R3 and R4 reference points. The MIH capable MN could have a MIH communication with other PoA in the candidate access networks via R2 reference point to obtain information services about the candidate network.

With regard to the MIH Information Service (MIIS) the providers offer access to their information server located in a MIH PoS node (upper far left). The operator provides the MIIS to mobile nodes so they can obtain pertinent information including but not limited to new roaming lists, costs, provider identification information, provider services, priorities and any other information that would enable to select and utilize services. As illustrated, it is possible for the mobile node to be pre-provisioned with MIIS data by its provider.

Also possible is for the mobile node to obtain MIH information services from any access network of its provider. MIIS could also be available from another overlapping or nearby network, using that network's MIIS point of service. A provisioner's network (depicted here as coupled with Access Network 3) may utilize R3 and R4 interfaces to access other MIH entities like the provisioner's or visited network's MIH information server.

With regard to the MIH Command Service (MICS), any of the Information Database may be also used as command service PoS. The MN MIHF typically communicates with this server using a layer three transport.

MIHF Services:

The MIHF provides asynchronous and synchronous services through well defined SAPs for link layers and MIH users. In the case of a system with multiple network interfaces of arbitrary type, the upper layers may use the Event service, Command service and Information service provided by MIH to manage, determine, and control the state of the underlying interfaces.

These services provided by MIH help the upper layers in maintaining service continuity, service adaptation to varying quality of service, battery life conservation, and network discovery and link selection. In a system containing heterogeneous network interfaces of 802 types and cellular 3GPP, 3GPP2 types, the Media Independent Handover Function may help the upper layers to implement effective procedures to couple services across heterogeneous network interfaces. Upper layers may utilize services provided by the MIHF across different entities to query resources required for a handover operation between heterogeneous networks.

MIH services in mobile devices facilitate seamless handover between heterogeneous networks. An MIH user such as a mobility management protocol (example Mobile IP) could be supported for handover and seamless session continuity. This shall not preclude other protocols in addition to Mobile IP and even other upper layers from making use of MIH services to optimize handovers.

Mobile nodes employing MIH services would receive indications from link layers for asynchronous operations like Event service. The interaction with Command service and Information service will be through synchronous query and response type of mechanisms.

The MIHF would also provide the functionality for the exchange of information between the network and host entities of the same media type. Note, if mechanism for such information exchange already exists with a given type of media (such as with some cellular media types), the MIHF will make use of the existing mechanism whenever possible.

MIH Protocol:

The I.E.E.E. 802.21 standard supports the Media Independent Event service, Media Independent Command service and Media Independent Information service. The MIH Protocol defines the format of the messages (i.e. MIHF packet with header and payload) that are exchanged between remote MIHF entities and the transport mechanisms that support the delivery of the messages. The selection of the transport mechanism is dependent on the access technology that connects the MN to the network and the location of the MIH PoS.

The packet payload for these services may be carried over L2 management frames, L2 data frames or other higher layer protocols. Wireless networks such as 802.11 and 802.16 have a management plane and support management frames which could be suitably enhanced for carrying the above payloads. However, the wired Ethernet network does not have management plane and may carry the above payloads only in data frames.

The I.E.E.E. 802.21 standard defines the packet format and payloads in media independent manner in standard TLV format. Thereafter, these packets may be encapsulated in a L2 MIH Protocol using MIHF Ethertype when the payload needs to be sent over normal data frames as in case of Ethernet. In other cases, the TLV based messages and payload may be directly encapsulated in media specific management frames. Alternatively, MIH protocol messages may be encapsulated using a lower layer (L2) or a higher layer (L3 and above) transport.

The I.E.E.E. 802.21 standard defines the format of MIH Protocol data unit (PDU) header and payload. Standard TLV format provides media-independent representation for the PDU payload contents. The MIHF PDUs are encapsulated in data frames with MIHF Ethertype over 802 links. For 802.11 and 802.16 links, extensions of media-specific management frames are recommended for carrying MIH messages. No assumptions are made in this standard regarding the transport of MIH messages over 3GPP and 3GPP2 access links at L2.

Figure 6:
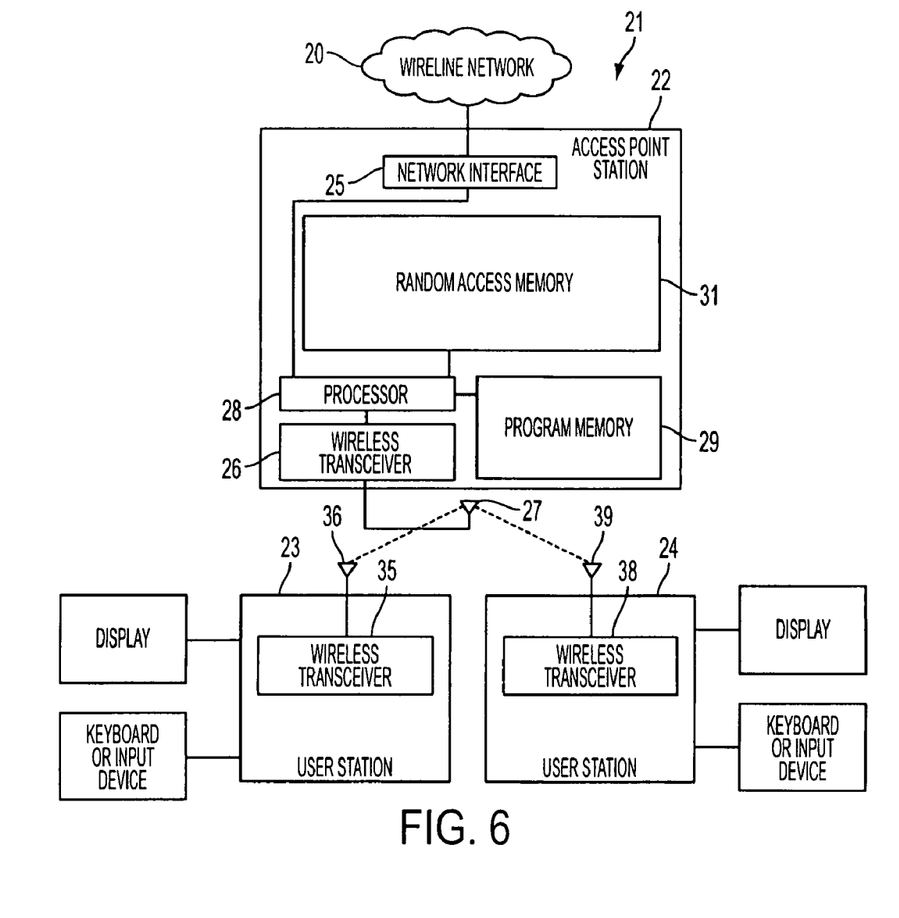
FIG. 6 depicts some illustrative architectural components that can be employed in some illustrative and non-limiting implementations including wireless access points to which client devices communicate.

Illustrative Architecture:

FIG. 6 depicts some illustrative architectural components that can be employed in some illustrative and non-limiting implementations including wireless access points to which client devices communicate. In this regard, FIG. 6 shows an illustrative wireline network 20 connected to a wireless local area network (WLAN) generally designated 21. The WLAN 21 includes an access point (AP) 22 and a number of user stations 23, 24. For example, the wireline network 20 can include the Internet or a corporate data processing network. For example, the access point 22 can be a wireless router, and the user stations 23, 24 can be, e.g., portable computers, personal desk-top computers, PDAs, portable voice-over-IP telephones and/or other devices. The access point 22 has a network interface 25 linked to the wireline network 21, and a wireless transceiver in communication with the user stations 23, 24. For example, the wireless transceiver 26 can include an antenna 27 for radio or microwave frequency communication with the user stations 23, 25. The access point 22 also has a processor 28, a program memory 29, and a random access memory 31. The user station 23 has a wireless transceiver 35 including an antenna 36 for communication with the access point station 22. In a similar fashion, the user station 24 has a wireless transceiver 38 and an antenna 39 for communication to the access point 22. By way of example, in some embodiments an authenticator could be employed within such an access point (AP) and/or a supplicant or peer could be employed within a mobile node or user station.

Figure 7:
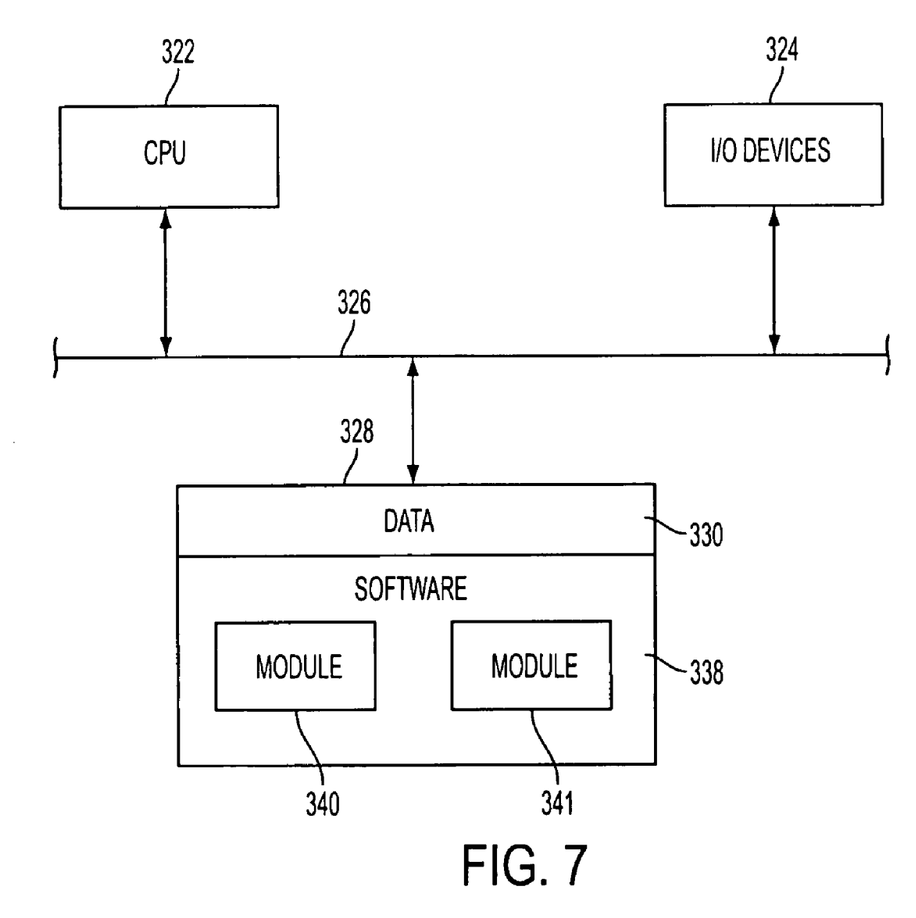
FIG. 7 depicts an illustrative computer or control unit that can be used to implement computerized process steps, to be carried out by devices, such as, e.g., an access point, an authenticator, a user station, a mobile node or another node in some embodiments.

FIG. 7 shows an illustrative computer or control unit that can be used to implement computerized process steps, to be carried out by devices, such as, e.g., an access point, an authenticator, a user station, a mobile node or another node in some embodiments. In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system.

This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

SUMMARY

The preferred embodiments of the present invention improve upon existing systems and/or methods.

According to some embodiments, a method is provided that includes: supporting multiple MIH Users by a single MIH Function under a constraint in which there is only one MIH User allowed to change the state of a link during a period of time. In some embodiments, the method further includes providing for the co-existence of multiple MIH Users by introducing a link ownership scheme in the MIH Function. In some embodiments, the method further includes the link ownership scheme involving an exclusive privilege to send request primitives that change the state of a link. In some embodiments, the method further includes employing a link ownership manager entity within the MIH Function that receives link ownership requests from MIH Users. In some examples, the method includes having the link ownership manager entity allocate available links for MIH Users. In some embodiments, the method includes that an available links means that no other MIH User has an exclusive right to send a request primitive for a particular link. In some embodiments, the method includes having the link ownership manager entity maintain a mapping of links and MIH Users which own the links. In some examples, the method includes having a remote MIH User control local links. In some examples, the method includes having the remote MIH User control a handover process. In some examples, the method includes having the remote user send a conflict request for local links on a local node to perform a handover. In some examples, the method includes having a local MIH User on the local node issue an MIH register request primitive with specifying an identifier of a remote MIHF on a network node as a destination MIHF identifier parameter of the primitive. In some examples, the MIH register request primitive includes a set-of-owned-links parameter. In some examples, the method includes that the set-of-owned-links parameter includes a list of link IDs representing local links which a remote user can own. In some examples, the method further includes having a local MIH User request link ownership on behalf of a remote MIH User. In some examples, the method further includes having the local MIH User request link ownership on behalf of the remote MIH User via a link ownership manager entity.

According to some embodiments, a method is provided that includes: providing for the co-existence of multiple MIH Users by introducing a link ownership scheme in an MIH Function. In some examples, the method further includes changing the state of a link of a mobile node by a network node by modifying a primitive to signal a set of allocated links to a remote MIH User on the network node. In some examples, the method includes having the primitive involve an I.E.E.E. 802.21 specification MIH_Register primitive.

According to some embodiments, a method is provided that includes: having a local node transmit a message to a remote node identifying a set of links that are supported by a local Media Independent Handover Function during a registration process. In some examples, the method further includes having the message include a parameter identifying a set of owned links such that the local MIH User notifies the remote MIH User of allocated links. In some examples, the method includes that a successful registration allows a remote MIH User to send conflict requests to links present in the set of owned links. In some examples, the method includes having a local MIH User employ re-registration to update a set of links that the remote MIH User can use. In some examples, the method includes that the set of links of advertised during the local node's registration process is used to pre-configure a remote node.

According to some examples, a system is provided that includes an MIH function configured to maintain a parameter identifying a set of links. In some examples, the system includes that the set of links includes a list of link IDs representing local links. According to some examples, the system includes that a local MIH User is configured to notify a remote MIH User of links based on the parameter identifying the set of links.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DISCUSSION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Introduction:

Currently, the I.E.E.E. 802.21 specification allows multiple MIH (Media-Independent Handover) Users in a single MIH Function. For reference, the following document is incorporated herein by reference in its entirety: I.E.E.E. 802.21/D06.00, Draft for Local and Metropolitan Area Networks: Media Independent Handover Service, June 2007 (hereinafter, Reference [1]).

However, the specification does not suggest how multiple MIH Users are supported by a single MIHF (MIH Function) and, in particular, under a constraint in which there is only one MIH User that is allowed to change the state of a particular link during a particular period of time.

The present application provides, among other things, an architecture that allows for the co-existence of multiple MIH Users by introducing a link ownership scheme in the MIHF (MIH Function). In the preferred embodiments, the proposed link ownership scheme also supports a scenario in which the state of a link of a mobile node is changed by a network node by modifying the MIH_Register primitives in the I.E.E.E. 802.21 specification to signal the set of allocated links to a remote MIH User on the network node.

Overview of the Problem:

The I.E.E.E. 802.21 specification, see Reference [1], allows multiple MIH (Media-Independent Handover) Users in a single MIH Function as shown in FIG. 11 of Reference [1]. However, the specification does not set forth or suggest how multiple MIH Users are supported by a single MIHF (MIH Function) under a constraint in which there is only one MIH User is allowed to change the state of a particular link under certain conditions. Such conditions exist when multiple MIH Users acting independently of each other will attempt to control and/or access the link simultaneously—i.e., a race condition. The problem can be further explained using the following example:

There are two MIH Users A and B on MIHF of an 802.21 capable device.

The 802.21 capable device has a WLAN (Wireless LAN) link (or interface). The state of the WLAN link is currently "full operation."

MIH User A issues local command A to change the state of the WLAN link to "turned off".

At the same time, MIH User B issues local command B to change the state of the WLAN to "power saving."

If local command A is executed before local command B, then the final state of the WLAN link will be "power saving" which is different from User A's expectation (i.e., "turned off"). On the other hand, if local command A is executed after local command B, then the final state of the WLAN link will be "turned off" which is different from User B's expectation (i.e., "power saving").

Moreover, the 802.21 specification allows remote MIH Users to access the local MIH Function. Similarly, an example of this problem is explained below:

There is MIH User A on MIHF of an 802.21 capable device. There is MIH User B on MIHF of a network node.

An 802.21 capable device has a WLAN (Wireless LAN) link (or interface). The state of the WLAN link is currently "full operation."

MIH User A issues local command A to change the state of the WLAN link to "turned off."

At the same time, MIH User B issues remote command B to change the state of the WLAN to "power saving."

If local command A is executed before remote command B, then the final state of the WLAN link will be "power saving" which is different from User A's expectation (i.e., "turned off"). On the other hand, if local command A is executed after remote command B, then the final state of the WLAN link will be "turned off" which is different from User B's expectation (i.e., "power saving").

In the above two examples, local command A and local/remote command B are conflicting with each other in that they cause inconsistency in the link state when executed in a particular period of time. To avoid such state inconsistency, a mechanism is needed to exclusively allow only one MIH User to issue such a command for a given link in the particular period of time. However, such mechanism is not described in the current 802.21 specification.

In addition to possible race-conditions, the I.E.E.E. 802.21 [1] specification currently does not define an efficient method for a local node to signal the remote node of the set of links that are present and supported by the local MIHF during the registration process. The remote node would need to go through extra signaling via MIH_Get_Link_Parameters request to obtain such information. However, the proposal in subsequent sections that allow for multiple MIH Users also resolves this issue.

There are also cases where the remote node is pre-configured with the set of links present on the local node. Although static configuration scenario is not common, the scheme presented in this document eases the well known issues that such configuration presents. The set of links advertised during the local nodes registration process can be used to override, change or update the set of statically pre-configure links as well as to announce the availability of those links.

The Preferred Embodiments

The present application provides new concepts, which are not present in the I.E.E.E. 802.21 specification (see Reference [1]), that can solve the aforementioned and/or other existing problems. These concepts include, e.g.:

1. a novel link ownership scheme; and
2. a novel remote link ownership allocation via, e.g., MIH_Register.request primitives.

The preferred embodiments for implementing these concepts are described below.

1. Link Ownership Scheme

The general concept of resource ownership is found in various systems. In most scenarios, ownership applies to the privilege of exclusively modifying the state or content of a resource—e.g., write privilege of a resource. In the case of I.E.E.E. 802.21 and multiple MIH Users, the resource is the link and link ownership is the exclusive privilege to send to request primitives that can change the state of a particular link such as, e.g., a MIH_Configure_Link. These request primitives are referred to as "conflict requests" in this document. Other MIH Users may be able to send a non-conflict request and subscribe to events on links which they do not own. However, only MIH Users that own the link can send a conflict request to links they own. Currently, conflict request primitives defined for the MIH_SAP (i.e., an I.E.E.E. 802.21 Service Access Point defined between MIH Users and MIHF) include the following:

1. MIH_Configure_Link.request;
2. MIH_MN_HO_Commit.request; and
3. MIH_Net_HO_Commit.request.

In addition, current non-conflict request primitives include the following:
1. MIH_Capability_Discovery.request;
2. MIH_Register.request;
3. MIH_DeRegister.request;
4. MIH_Event_Subscribe.request;
5. MIH_Event_UnSubscribe.request;
6. MIH_Get_Link_Parameters.request;
7. MIH_Scan.request;
8. MIH_MN_HO_Candidate_Query.request;
9. MIH_Net_HO_Candidate_Query.request;
10. MIH_N2N_HO_Query_Resources.request;
11. MIH_MN_HO_Complete .request;
12. MIH_N2N_HO_Complete .request;
13. MIH_Configure_Link.request; and
14. MIH_Get_Information.request To provide management of link ownership, this document introduces a link ownership manager (LOM) entity within MIHF. The LOM is responsible for receiving link ownership requests from MIH Users. The LOM allocates "available" links for MIH Users; availability in this case means that no other MIH User claims exclusive rights to send a conflict request for a particular link. The LOM is also responsible for maintaining a mapping of links and MIH Users which owns them.

Figure 1:
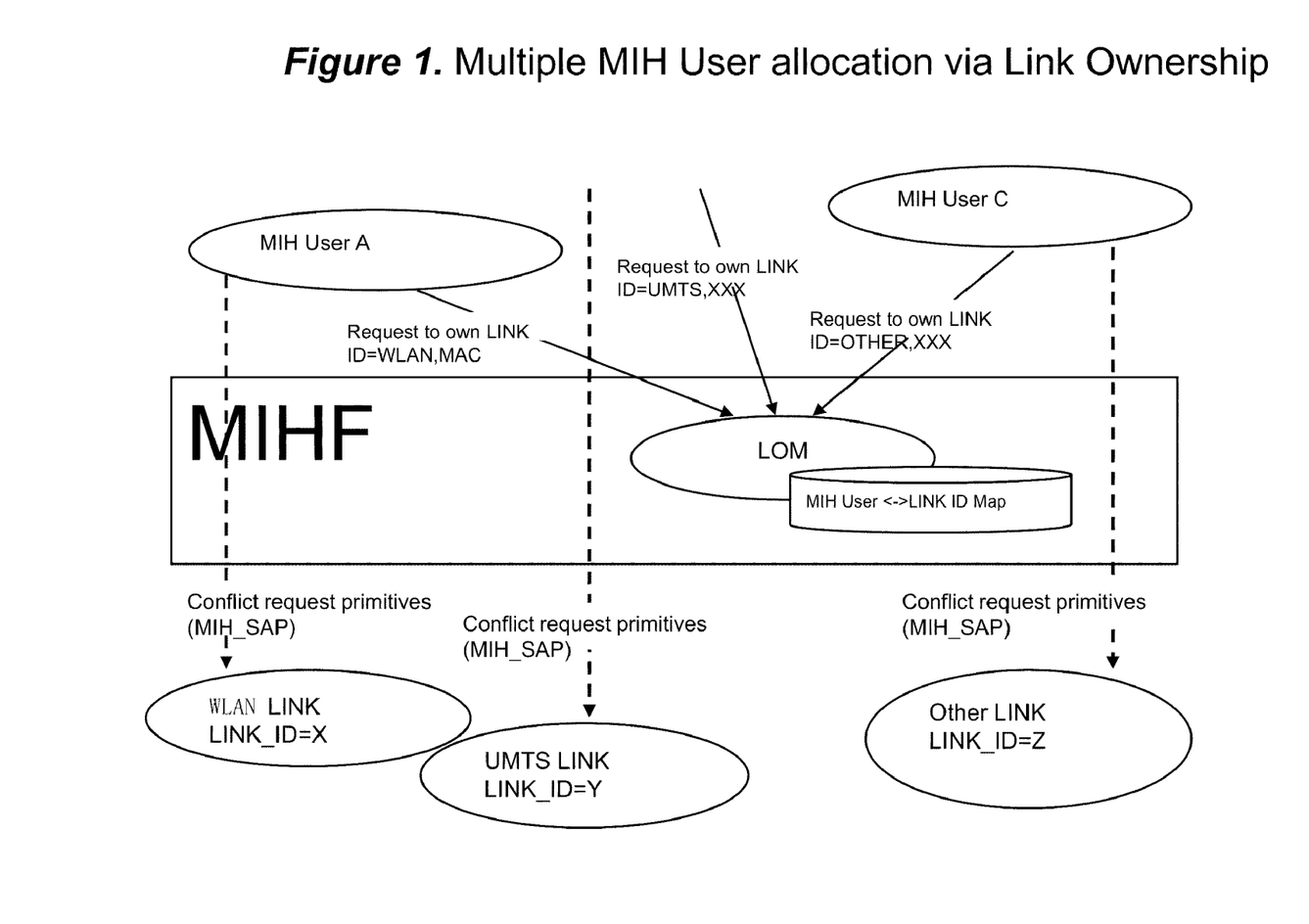
FIG. 1 is a diagram showing multiple MIH User allocation via Link Ownership according to some exemplary embodiments.

To summarize, a basic link ownership scheme according to some preferred embodiments for local MIH Users is shown in FIG. 1 which depicts Multiple MIH User allocation via Link Ownership.

In FIG. 1, each MIH User requests ownership allocation of a particular link via MIH_SAP. For example, MIH User A requests ownership of WLAN LINK via an API function call to the local MIHF. Using another API function call, the same MIH User can also request for the release of ownership of link(s) that it owns if it determines it no longer needs to send conflict request to them. Since the API is local to the MIHF, it is implementation specific (including the manner in which each MIH User is identified by the MIHF) and can be configured according to the circumstances at hand by those in the art based on this disclosure. In some embodiments discussed in this document, the allocation policy followed by the LOM is on a first-come first-serve basis (F.I.F.O.), but alternate or additional polices can be enforced depending on implementation.

2. Remote Link Ownership via MIH_Register Request Primitive

The previous section describes a method where local MIH Users are able to request link ownership locally. However, I.E.E.E. 802.21 (see Reference [1] above) also describes a method where a remote MIH User is able to monitor and/or control local link(s). This is useful in cases where, e.g., a remote MIH User has control over a handover process. Therefore, in this scenario, the remote user is able to send a conflict request for local links on the local 802.21 capable device to complete the handover. Preferably, the local MIH User on the 802.21 capable device authorizes this by issuing an MIH_Register.request primitive with specifying the identifier of the remote MIHF on the network node as the destination MIHF identifier parameter of the primitive. Upon receiving the MIH_Register.request primitive, the local MIHF sends an MIH_Register MIH protocol message to the remote MIHF. The remote MIHF will receive the message and then generate an MIH_Register.indication primitive to an appropriate remote MIH User (e.g., a remote MIH User that performs network controlled handover).

The local MIH User would request link ownership on behalf of the remote MIH User. Using the same scheme presented in Section 3, the local MIH User will request link ownership of one or more links with the LOM using the same set of local APIs. It then uses the MIH_Register.request primitive to signal to the remote MIH User of the set of links it has gotten. This introduces a change in the MIH_Register request primitive to include the allocated set of links. The changes are preferably as follows:

MIH_Register.request(DestinationId, SetOfOwnedLinks, RequestCode)

Where:
DestinationId—(e.g., an MIHF ID as defined in Section 7.4.2 of I.E.E.E. 802.21 (see Reference [1] above)).
SetOfOwnedLinks (note: this is a newly added parameter)—A list of LINK ID representing local links which the remote user can own.
RequestCode—(e.g., a Request code as defined in Section 7.4.2 of I.E.E.E. 802.21 (see Reference [1] above)).

Adding the parameter SetOfOwnedLinks allows the local MIH User to notify the remote MIH user of the links it has allocated on its behalf. A successful registration will allow the remote MIH User to send conflict request to links present in SetOfOwnedLinks. The current I.E.E.E. 802.21 (see Reference [1] above) specification also supports re-registration via the RequestCode parameter—e.g., RequestCode equal to one (1). Although this is not common, the local MIH User can take advantage of the re-registration feature to update the set of links that the remote MIH User can use. In this case, a re-registration can contain a new set of links for the remote MIH User.

A successful registration process has the additional benefit of forgoing the need by the remote MIH User to send an MIH_Get_Link_Parameters to obtain a set of links which it can subscribe events from. This promotes a more efficient signaling between local and remote MIH Users.

Figure 2:
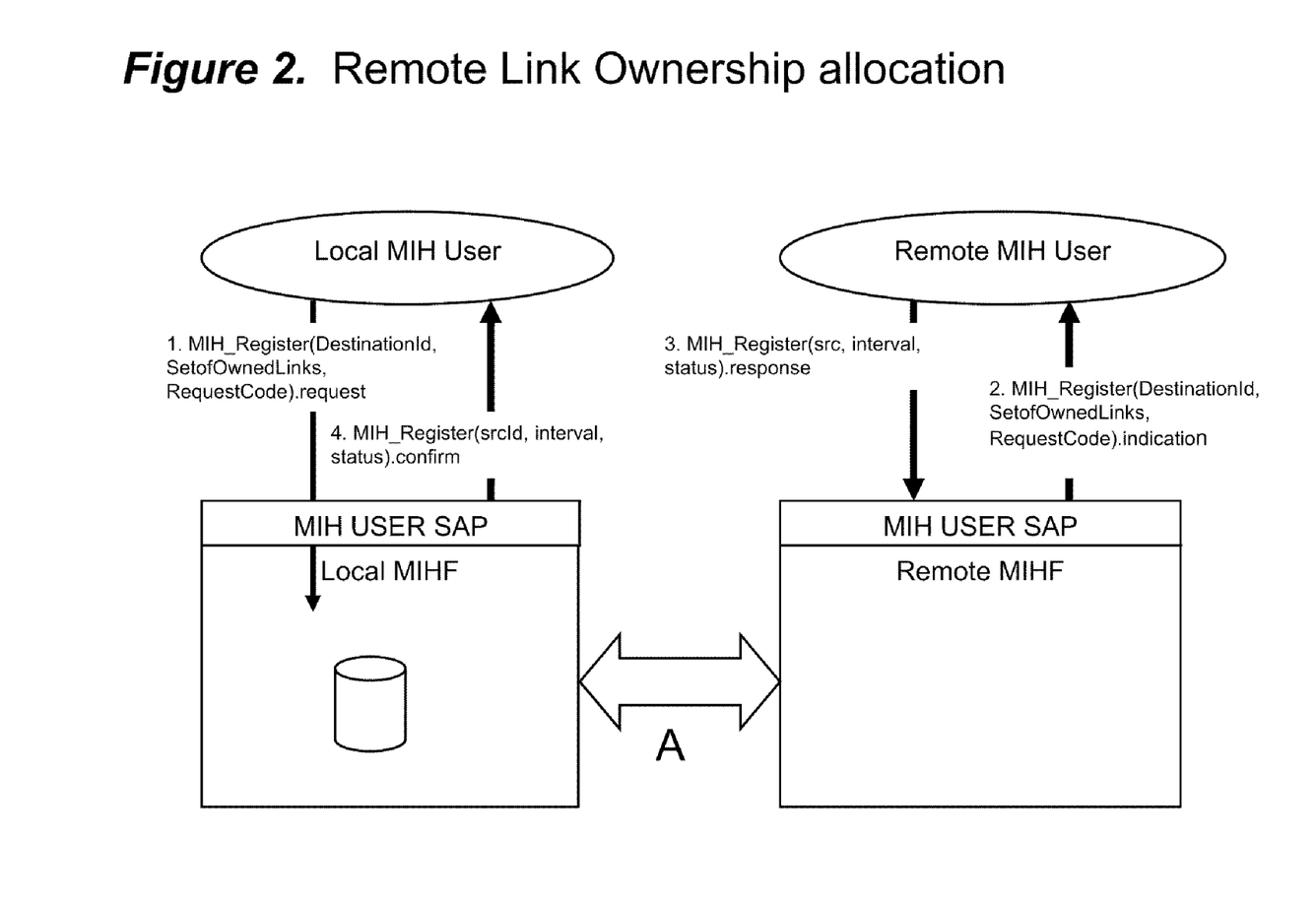
FIG. 2 is a diagram showing remote Link Ownership allocation according to some exemplary embodiments.

For reference, FIG. 2 shows a summary of the proposed remote link ownership scheme according to some embodiments. In this regard, FIG. 2 shows a basic step-by-step process on how remote MIH Users are allocated ownership a set of local links according to some examples. In this regard, FIG. 2 shows a Local MIH User at a Local MIHF and a Remote MIH User at a Remote MIHF. As described above, as shown at 1 in FIG. 1, the Local MIH User sends an MIH_Register.request primitive (DestinationID, SetofOwnedLinks, RequestCode) to the Local MIHF. The Local MIHF then transmits an MIH_Register MIH protocol message to the remote MIHF (see arrow A in FIG. 2). As shown at 2 in FIG. 2, the Remote MIHF then generates an MIH_Register.indication primitive (DestinationID, SetofOwnedLinks, RequestCode) to an appropriate remote MIH user. As shown at 3, the Remote MIH User generates an MIH_Register.response primitive (src, interval, status) to the Remote MIHF. As shown at 4 in FIG. 2, the Local MIHF then generates a MIH_Register.confirm primitive (srcID, interval, status) to the Local MIH User.

To release ownership, the local MIH user sends a MIH_DeRegister request primitive. This signals the remote MIH User that it can no longer own the link(s) in latest SetOfOwnedLinks it has received. In this case, however, there are no changes required in MIH_DeRegister request primitive.

Figure 3:
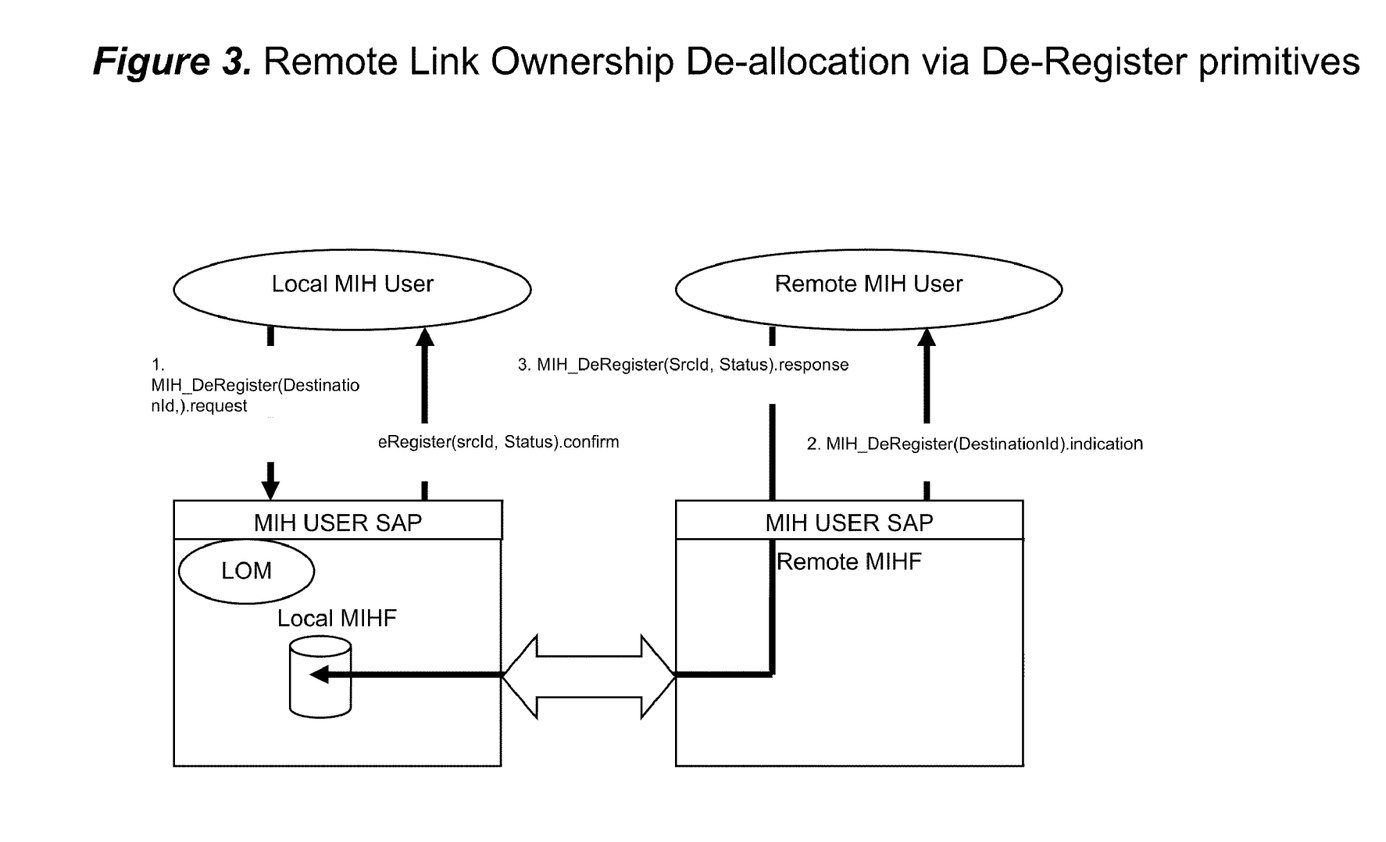
FIG. 3 is a diagram showing remote Link Ownership De-Allocation via De-Register primitives according to some exemplary embodiments.

For reference, FIG. 3 shows Remote Link Ownership De-allocation via De-Register primitives according to some illustrative embodiments. In summary, as shown at 1, the Local MIH User initiates this by issuing an MIH_DeRegister.request primitive. Thereafter, steps 2, 3 and 4 are carried out as shown in FIG. 3.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example;" and "NB" which means "note well."

What is claimed is:

1. A method, comprising:
supporting multiple MIH (Media-Independent Handover) Users by a single MIH Function under a constraint in which there is only one MIH User allowed to change the state of a link during a period of time;
further including providing for the co-existence of multiple MIH Users by introducing a link ownership scheme in the MIH Function, wherein the link ownership involves an exclusive privilege to send request primitives that change the state of a link; and
further including having a link ownership manager entity within the MIH Function allocate available links for MIH Users according to an allocation policy under said link ownership scheme and in response to ownership requests from MIH Users.

2. The method of claim 1, further including that an available links means that no other MIH User has an exclusive right to send a request primitive for a particular link.

3. The method of claim 1, further including having the link ownership manager entity maintain a mapping of links and MIH Users which own the links.

4. The method of claim 1, further including having a remote MIH User control local links.

5. The method of claim 4, further including having the remote MIH User control a handover process.

6. The method of claim 5, further including having the remote user send a conflict request for local links on a local node to perform a handover.

7. The method of claim 6, further including having a local MIH User on the local node issue an MIH register request primitive with specifying an identifier of a remote MIHF on a network node as a destination MIHF identifier parameter of the primitive.

8. The method of claim 1, further including having a local MIH User request link ownership on behalf of a remote MIH User.

9. The method of claim 8, further including having the local MIH User request link ownership on behalf of the remote MIH User via a link ownership manager entity.

10. The method of claim 1, wherein said allocation policy is a first-come first-serve basis.

11. A method comprising:
supporting multiple MIH (Media-Independent Handover) Users by a single MIH Function under a constraint in which there is only one MIH User allowed to change the state of a link during a period of time further including having a remote MIH User control local links;
further including having the remote MIH User control a handover process~
further including having the remote user send a conflict request for local links on a local node to perform a handover;
further including having a local MIH User on the local node issue an MIH register request primitive with specifying an identifier of a remote MIHF on a network node as a destination MIHF identifier parameter of the primitive; wherein the MIH register request primitive includes a set-of-owned-links parameter.

12. The method of claim 11, wherein said set-of-owned-links parameter includes a list of link IDs representing local links which a remote user can own.

13. A method, comprising:
providing for the co-existence of multiple MIH (Media-Independent Handover) Users by introducing a link ownership scheme in an MIH Function, further including providing a link ownership entity in the MIH Function adapted to:
a) receive link ownership requests from MIH Users for an exclusive privilege to send request primitives that change the state of a link~ and
b) allocate available links in response to the ownership requests for the MIH Users according to an allocation policy.

14. The method of claim 13, further including changing the state of a link of a mobile node by a network node by modifying a primitive to signal a set of allocated links to a remote MIH User on the network node.

15. The method of claim 14, further including having said primitive involve an I.E.E.E. 802.21 specification MIH_Register primitive.

16. A method comprising:
having a local node transmit a message to a remote node identifying a set of links that are supported by a local Media Independent Handover Function during a registration process further including having said message include a parameter
identifying a set of owned links such that the local MIH (Media-Independent Handover) User notifies the remote MIH User of allocated links; further including that a successful registration allows a remote MIH User to send conflict requests to links present in said set of owned links.

17. A method comprising:
having a local node transmit a message to a remote node identifying a set of links that are supported by a local Media Independent Handover Function during a registration process further including having said message include a parameter identifying a set of owned links such that the local MIH (Media-Independent Handover) User notifies the remote MIH User of allocated links; further including having a local MIH User employ re-registration to update a set of links that the remote MIH User can use.

18. The method of claim 17, further including that a set of links of advertised during the local node's registration process is used to pre-configure a remote node.

19. A system, comprising:
an MIH (Media-Independent Handover) function of a local node configured to maintain a parameter identifying a set of links that are supported by the MIH function during a registration process and configured to transmit a message with said parameter to a remote node identifying said set of links such as to notify the remote MIH User of allocatable links, and configured to receive conflict requests from the remote MIH User for allocation of a link in said set of links.

20. The system of claim 19, wherein said set of links includes a list of link IDs representing local links.

21. The system of claim 20, wherein a local MIH User is configured to notify a remote MIH User of links based on said parameter identifying the set of links.

22. The method of claim 13, wherein said allocation policy is a first-come first-serve basis.

* * * * *